United States Patent
Van Wagenen

(10) Patent No.: US 8,230,548 B2
(45) Date of Patent: Jul. 31, 2012

(54) APPARATUS FOR REMOVING A WASTE PRODUCT

(75) Inventor: David R. Van Wagenen, Minden, NV (US)

(73) Assignee: General Electric Company, Schenectady, NY (US)

( * ) Notice: Subject to any disclaimer, the term of this patent is extended or adjusted under 35 U.S.C. 154(b) by 498 days.

(21) Appl. No.: 12/126,132

(22) Filed: May 23, 2008

(65) Prior Publication Data

US 2009/0288267 A1    Nov. 26, 2009

(51) Int. Cl.
*A47L 5/38* (2006.01)
*A47L 15/00* (2006.01)
*H02G 1/12* (2006.01)
*B26D 7/06* (2006.01)
*B21F 13/00* (2006.01)

(52) U.S. Cl. ............... 15/301; 81/9.4; 81/9.51; 83/100; 30/90.1

(58) Field of Classification Search .......... 30/90.1–90.3; 83/100; 81/9.4–9.44, 9.51; 248/907, 309.4, 248/311–313

See application file for complete search history.

(56) References Cited

U.S. PATENT DOCUMENTS

| 3,322,169 | A | * | 5/1967 | Hilliard | 83/100 |
| 3,525,183 | A | * | 8/1970 | Gargrave | 451/453 |
| 3,951,016 | A | * | 4/1976 | Gudmestad et al. | 81/9.51 |
| 4,352,305 | A | * | 10/1982 | Rodenbeck | 81/9.51 |
| 4,999,910 | A | * | 3/1991 | Cross | 29/825 |
| 5,084,972 | A | | 2/1992 | Waugh | |
| 5,255,585 | A | * | 10/1993 | Gordon | 83/100 |
| 5,594,972 | A | * | 1/1997 | Iversen | 15/301 |
| 5,904,610 | A | * | 5/1999 | Ciniglio et al. | 451/38 |
| 6,123,556 | A | | 9/2000 | Asakura et al. | |
| 6,749,166 | B2 | * | 6/2004 | Valentine et al. | 248/309.1 |
| 6,963,032 | B2 | | 11/2005 | Yamaguchi et al. | |
| 2002/0005091 | A1 | | 1/2002 | Meisser et al. | |
| 2007/0089262 | A1 | * | 4/2007 | Drevitson et al. | 15/339 |

\* cited by examiner

*Primary Examiner* — Bryan R Muller

(74) *Attorney, Agent, or Firm* — Armstrong Teasdale LLP

(57) ABSTRACT

A method of removing a waste product includes forming a waste product during operation of at least one sheath removal device. The method also includes inducing a fluid flow in a vicinity of waste product formation. The method further includes removing at least a portion of the waste product with the induced fluid flow.

10 Claims, 7 Drawing Sheets

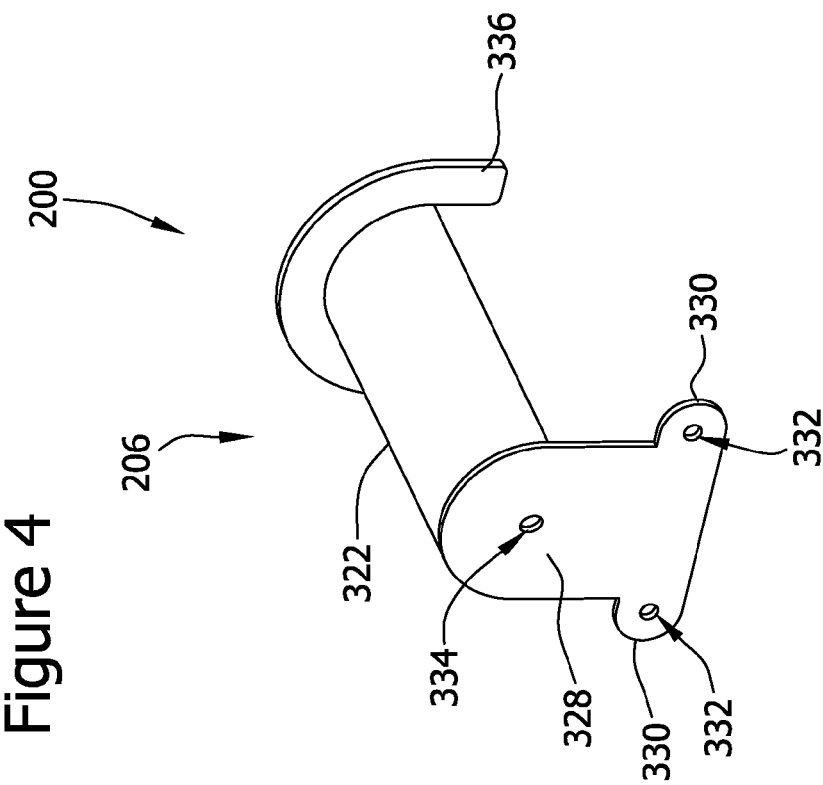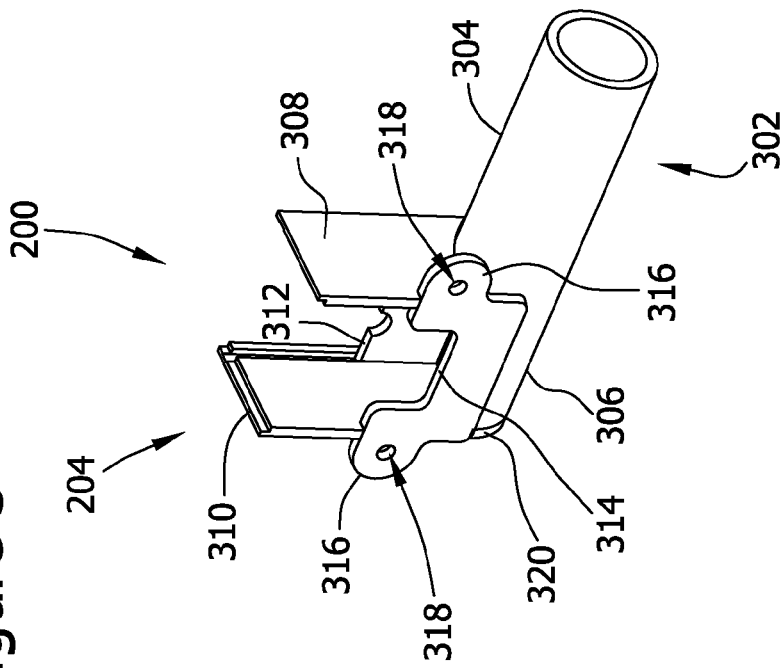

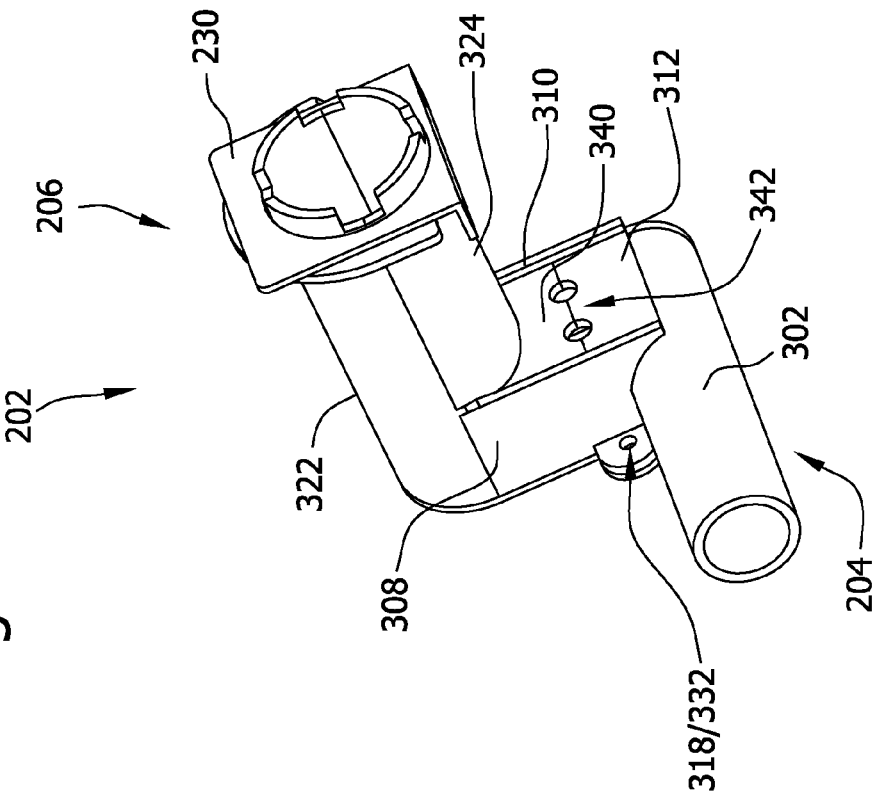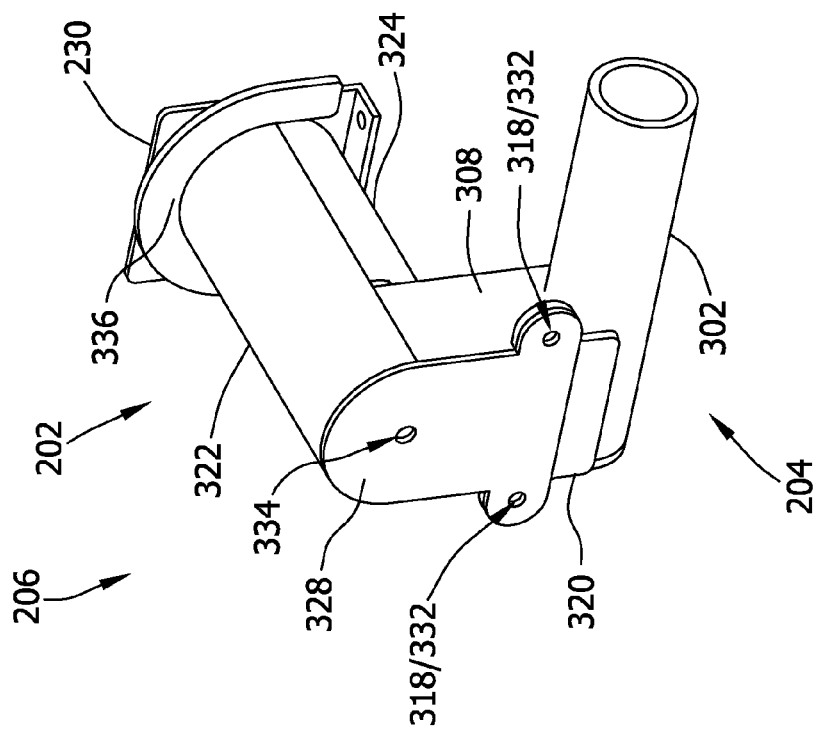

APPARATUS FOR REMOVING A WASTE PRODUCT

BACKGROUND OF THE INVENTION

The present invention relates generally to fabrication devices and tools and more particularly, to an apparatus for removing a waste product generated by stripping wires and cables and a method for operating same.

Many known electrical and electronic devices include a plurality of electrical and electronic components that are electrically coupled to each other using coaxial cables, triaxial cables, and/or insulated wiring that are often cut to fit. At least some known cables include a braided shield layer that circumferentially encases a current conducting material and an insulating layer that encases the braided shield layer. Some known braided shield layers are fabricated from conductive materials that include copper, silver, steel, and nickel, and some known insulating layers are fabricated from plastic sheathing material.

Each cable, when cut, has at least two ends wherein the braid and sheath are stripped off of the conductors using a cable stripping machine. Stripping the braid and sheath from the cables enables the cables to be connected to their associated electrical components. However, such stripping activities may cause waste products that include braid bits to form that may jam the stripping machine, and/or create a cleanliness nuisance. Moreover, forming a large amount of braid bits increases the intensity and frequency of cleanup efforts and thereby reduces productivity associated with each stripping machine. Therefore, at least some economic loss may be incurred as a result of halting stripping activities, removing the stripping machine from service, and cleaning the stripping machine. Accordingly, it would be desirable to provide a method and/or an apparatus that automates effective braid bit reduction.

BRIEF DESCRIPTION OF THE INVENTION

In one aspect, a method of removing a waste product is provided. The method includes forming a waste product during operation of at least one sheath removal device. The method also includes inducing a fluid flow in a vicinity of waste product formation. The method further includes removing at least a portion of the waste product with the induced fluid flow.

In another aspect, a sheath removal waste product reduction system is provided. The system includes at least one conduit configured to couple to a sheath removal machine. The system also include at least one fluid flow induction device coupled in flow communication with the at least one conduit. The at least one fluid flow induction device induces a predetermined fluid carrying velocity within the at least one conduit.

In a further aspect, a sheath removal machine is provided. The machine includes at least one sheath cutting device and a sheath removal waste product reduction system. The system includes at least one conduit configured to be coupled in flow communication with the at least one sheath cutting device. The system also includes at least one fluid flow induction device coupled in flow communication with the at least one conduit. The at least one fluid flow induction device induces a predetermined fluid carrying velocity within the at least one conduit.

The methods and apparatus described herein facilitate reducing braid bit buildup and/or fouling of the stripper machine. As such, machine downtime for cleaning, and nuisance fouling of the associated work area, are facilitated to be reduced. Moreover, the apparatus may be retrofitted to existing stripping machines, is substantially automated, and may remain in service substantially continuously during stripping operations, such that real-time cleaning is facilitated.

BRIEF DESCRIPTION OF THE DRAWINGS

FIG. 3 is a perspective schematic view of an exemplary vacuum box used with the cable stripping waste product reduction system shown in FIGS. 1 and 2;

FIG. 4 is a perspective schematic view of a portion of the cable stripping waste product reduction system shown in FIGS. 1 and 2;

FIG. 5 is a front perspective schematic view of an exemplary vacuum fixture mechanism used with the cable stripping waste product reduction system shown in FIG. 1;

FIG. 6 is a rear perspective schematic view of the vacuum fixture mechanism shown in FIG. 5;

DETAILED DESCRIPTION OF THE INVENTION

The methods and apparatus described herein facilitate reducing braid bit buildup and fouling of an associated sheath removal machine, and more specifically, a cable stripping machine. As such, the methods and apparatus facilitate cost-effective and reliable operation of such stripper machines. Specifically, the cable stripping waste product reduction systems described herein use a vacuum process that facilitates establishing a predetermined fluid carrying velocity and reducing nuisance braid bits as soon as such braid bits are formed. Reducing the buildup of braid bits as described herein facilitates reducing machine downtime for cleaning, thus reducing nuisance fouling of the associated work area. The cable stripping waste product reduction systems may be installed at the factory or retrofitted to existing stripping machines. The cable stripping waste product reduction system is substantially automated and may be used in service substantially continuously during stripping operations, thereby enabling real-time cleaning. Moreover, the system may be assembled and/or disassembled easily to facilitate reducing machine down time. Further, the system facilitates improving the quality of cable stripping while reducing rework and/or scrap by reducing the frequency of materials getting lodged within the stripper machine's cutting devices.

Figure 1:
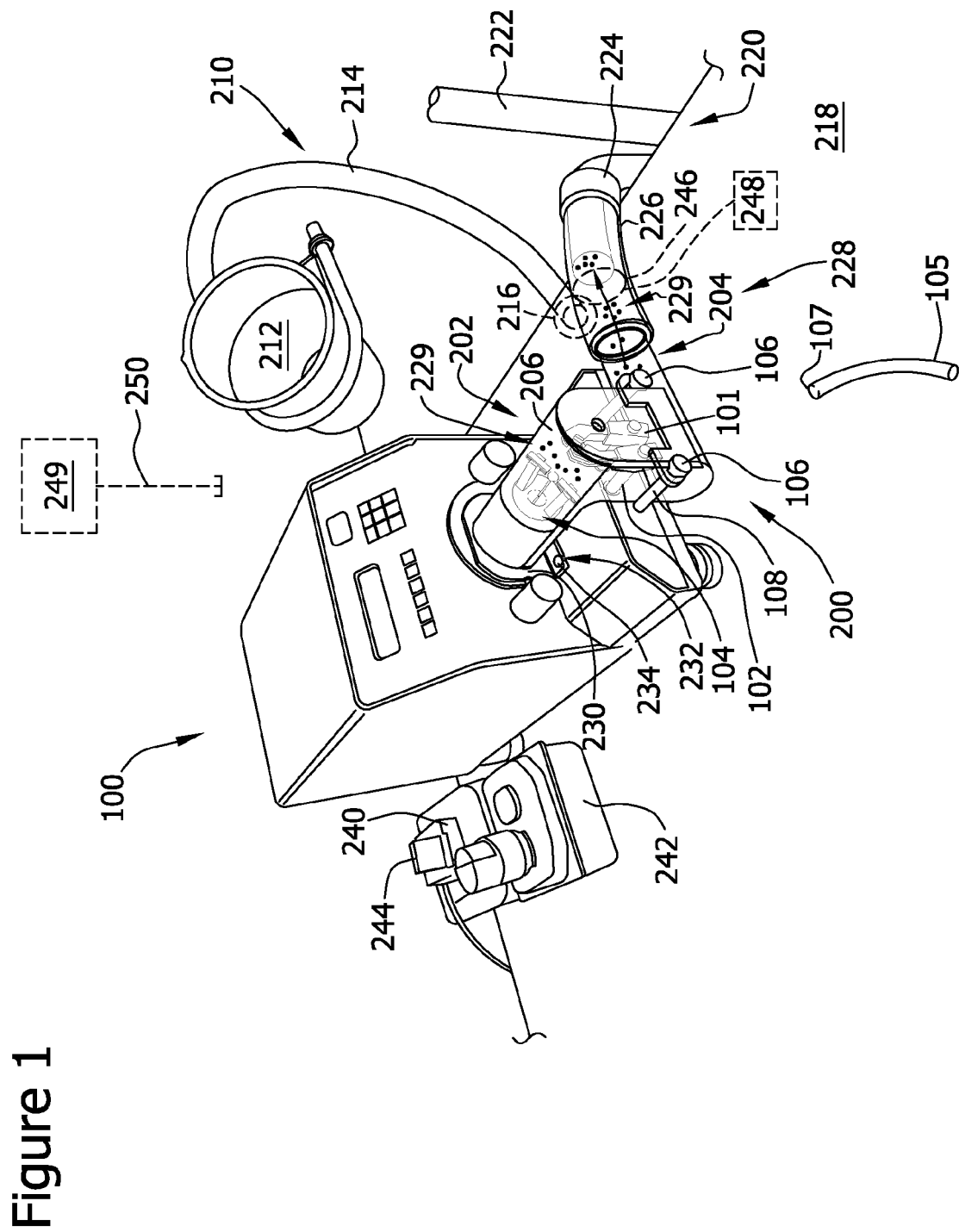
FIG. 1 is a perspective schematic view of an exemplary cable stripping machine and an exemplary cable stripping waste product reduction system.
Figure 2:
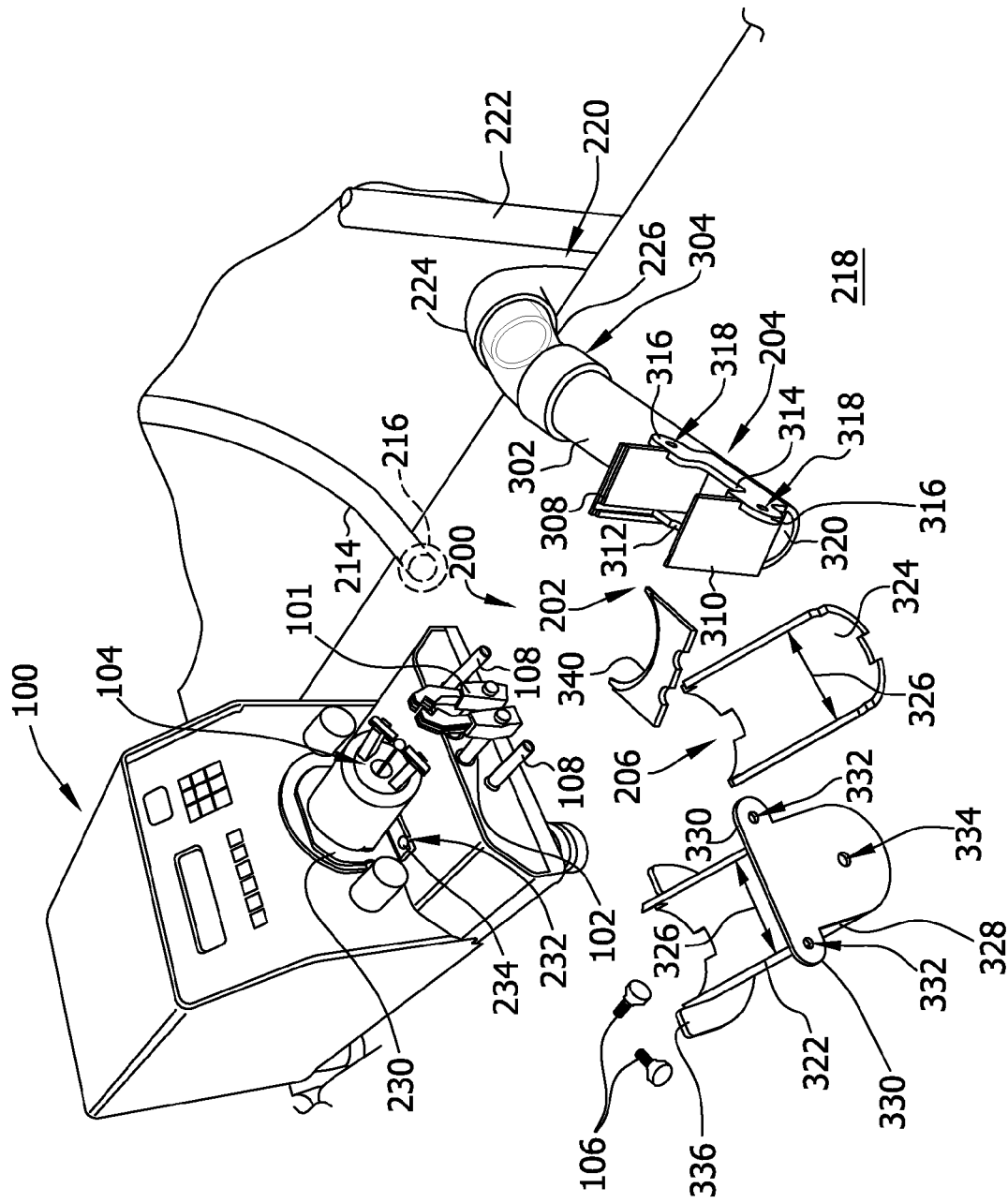
FIG. 2 is a perspective schematic view of the cable stripping machine shown in FIG. 1, wherein the cable stripping waste product reduction system is partially disassembled.

FIG. 1 is a perspective schematic view of an exemplary sheath removal machine, or more specifically, cable stripping machine 100 and an exemplary sheath removal waste product reduction system, or more specifically, a cable stripping waste product reduction system 200. FIG. 2 is a perspective schematic view of cable stripping machine 100 wherein system 200 is partially disassembled. The methods and apparatus of the exemplary embodiment of cable stripping as described herein can be applied to other operations that include, but are not limited to, braided hose sheathing removal. In the exemplary embodiment, cable stripping machine 100 includes a plurality of cable gripper jaws 101 that are operably coupled to a plurality of gripper jaw drive rods 102. Also, in the exemplary embodiment, machine 100 includes a plurality of sheath cutting devices or cable stripping devices or, more specifically, cutting heads 104. Moreover, in the exemplary embodiment, cable stripping machine 100 is a commercially-available, orbital cable stripping machine that is retrofitted with system 200. Alternatively, cable stripping machine 100 may be factory-assembled with system 200. Cable stripping machine 100, as described in more detail herein, strips braid and insulation jacket (neither shown) from a braided and jacketed coaxial and/or triaxial cable 105 including a cable end 107. Moreover, machine 100 is adaptably configured to strip twisted pair wiring, single conductor wiring, and multi-conductor cable and wiring (neither shown).

In the exemplary embodiment, a stock debris deflector (not shown) is removed from cable stripping machine 100, and system 200 is coupled to cable stripping machine 100 with a pair of thumbscrews 106 in cooperation with a plurality of fastening protrusions 108. In the exemplary embodiment, protrusions 108 are secured to cable stripping machine 100, and thumbscrews 106 and protrusions 108 are originally-supplied stock components that were previously used to couple the stock debris deflector to cable stripping machine 100.

System 200 includes a vacuum fixture mechanism 202. In the exemplary embodiment, mechanism 202 includes a vacuum box subassembly 204 and a top half subassembly 206. More specifically, in the exemplary embodiment, mechanism 202 is fabricated from a plurality of substantially transparent polycarbonate members (each discussed in more detail below) that are assembled to form vacuum box subassembly 204 and top half subassembly 206. Alternatively, mechanism 202 may include any number of subassemblies that enables operation of system 200 as described herein. In one embodiment, mechanism 202 is a unitary member. In another embodiment, subassemblies 204 and 206 are unitary members. Further, in the exemplary embodiment, subassemblies 204 and 206 form vacuum fixture mechanism 202 such that mechanism 202 is substantially encloses cutting heads 104, thereby substantially decreasing a potential for debris to escape system 200 to approximately zero. Alternatively, mechanism 202 encloses cutting heads 104 to the extent necessary to facilitate operation of system 200 and machine 100 as described herein.

In the exemplary embodiment, system 200 also includes a manual cable snipping station 210. Station 210 includes a collection cup 212 that is adjustably coupled to a flexible positioning member or neck 214. In the exemplary embodiment, neck 214 is adjustably coupled to a magnetic base 216 that is magnetically coupled to a metallic portion of a table 218. Alternatively, station 210 may have any configuration that enables operation of system 200 as described herein, including, but not limited to, fixed components that are securely coupled to table 218.

System 200 also includes a fluid flow induction device that, in the exemplary embodiment, is a vacuum subsystem 220 that includes a vacuum source 222. In the exemplary embodiment, vacuum source 222 is an industrial vacuum system. Alternatively, vacuum source 222 may be any suction source that includes, but is not limited to, portable vacuums. Subsystem 220 also includes a flexible, portable vacuum hose 224 that is coupled in flow communication with vacuum source 222. A transition piece 226 couples hose 224 in flow communication to vacuum box subassembly 204. Hose 224 decouples from piece 226 to facilitate manual cleaning around cable stripping machine 100, including removal of material from collection cup 212. Vacuum box subassembly 204, top half subassembly 206, hose 224, and transition piece 226 cooperate to define a stripping waste product transport path 228 that channels cable stripping waste products 229. Moreover, stripping waste product transport path 228 cooperates with vacuum subsystem 220 to generate sufficient flow and carrying velocity to transport cable stripping waste products 229.

In the exemplary embodiment, design considerations include, but are not limited to, sizing and orientating mechanism 202 and sizing vacuum subsystem 220 in conjunction with each other such that vacuum system 220 cooperates with mechanism 202 to establish the predetermined fluid carrying velocity.

System 200 also includes an adaptor piece 230 that enables system 200 to couple to cable stripping machine 100. In the exemplary embodiment, adaptor piece 230 is a machined piece of stock aluminum that has been formed to conform to features of cable stripping machine 100 and to top half subassembly 206. Also, in the exemplary embodiment, at least one fastener orifice 232 is formed in a portion of cable stripping machine 100. Orifice 232 is sized to receive a standard fastener 234 therein. Alternatively, any means of adapting system 200 to cable stripping machine 100 that enables operation of cable stripping machine 100 and system 200 as described herein may be used.

In the exemplary embodiment, cable stripping machine 100 includes an electrical control circuit 240 that senses when stripping devices or cutting heads 104 are energized. Moreover, vacuum subsystem 220 includes an electrical control circuit 242 that energizes vacuum source 222. Circuits 240 and 242 are electrically coupled together, wherein the technical effect is to enable automatic operation of vacuum subsystem 220 with operation of cable stripping machine 100. More specifically, electrical control circuits 240 and 242 are coupled together via at least one standard electrical connector and/or connection 244 including, but not limited to, splices, relays and/or contactors. Alternatively, control features of circuits 240 and 242 may be integrated into either an electrical or electronic control device (not shown) such as, but not limited to, a relay panel, a programmable logic computer (PLC), a standard desktop computer, and/or a laptop computer. Alternatively, cutting heads 104 and vacuum subsystem 220 may be operated independently of each other. Further, alternatively, vacuum source 222 is in substantially continuous operation.

Alternative embodiments of system 200 include a control valve 246 (illustrated in phantom) that is positioned within transition piece 226 between cable cutting heads 104 and vacuum source 222. Valve 246 includes an electrical control circuit 248 (also illustrated in phantom) that is coupled to circuit 240 via at least one standard electrical connector and/or connection 244 including, but not limited to, splices, relays and/or contactors. The technical effect is to facilitate circuits 240 and 248 to work in combination to enable automatic operation of vacuum subsystem 220 with operation of cable stripping machine 100. Alternatively, the control features of circuits 240 and 248 may be integrated into either an electrical or electronic control device (not shown) that includes, but is not limited to, a relay panel, a PLC, a standard desktop computer, and/or a laptop computer. In other alternative embodiments, cutting heads 104 and valve 246 are operated independently of each other. Moreover, alternatively, vacuum source 222 is in substantially continuous operation, wherein positioning of valve 246 is performed in conjunction with operation in machine 100 to establish a predetermined fluid carrying velocity.

Further alternative embodiments of cable stripping waste product reduction system 200 may include a positive pressure source such as, but not being limited to, a pressurized fluid source, or more specifically, a compressed gas supply 249. Compressed gas supply 249 is coupled to machine 100 and/or system 200 upstream of cutting heads 104 via a compressed gas conduit 250. Supply 249 and conduit 250 are operated manually and/or automatically to enhance cable stripping waste products 229 transport by facilitating establishment of the predetermined fluid carrying velocity within system 200. The gas used includes, but is not limited to, compressed air and nitrogen.

An exemplary method of removing a waste product, or cable stripping waste products 229 includes forming waste products 229 during operation of at least one sheath removal device or cable stripping device, that is, cutting heads 104. The method also includes inducing a fluid flow in a vicinity of waste product formation. The method further includes removing at least a portion of waste products 229 with the induced fluid flow.

FIG. 3 is a perspective schematic view of vacuum box subassembly 204. In the exemplary embodiment, subassembly 204 is fabricated from a polycarbonate material and is substantially transparent. Alternatively, subassembly 204 may be fabricated from any material with any opacity that facilitates operation of system 200 as described herein. Subassembly 204 includes a first piece 302 that includes a substantially cylindrical end 304 that is coupled in flow communication with transition piece 226. Piece 302 also includes a substantially semi-cylindrical end 306.

Subassembly 204 also includes a second piece 308 that is coupled to piece 302 between ends 304 and 306. A substantially rectangular end piece 310 is coupled to piece 302 at an outermost portion of end 306. Pieces 308 and 310 enable coupling subassembly 204 to subassembly 206. Subassembly 204 also includes a lower inboard piece 312 and a lower outboard piece 314. Piece 312 is substantially rectangular and includes a plurality of semi-circular cutouts (not shown) that are discussed further below. Piece 314 includes two extensions 316 that each include an orifice 318 defined therein. Each orifice 318 is sized to receive thumbscrews 106 therein that enable system 200 to coupled to cable stripping machine 100. Pieces 312 and 314 are both coupled to pieces 308 and 310 such that structural integrity and alignment of subassembly 204 is facilitated. Subassembly 204 also includes a semi-circular piece 320 that extends from end 306 and piece 310 such that structural integrity and alignment of subassembly 204 is facilitated.

FIG. 4 is a perspective schematic view of a portion of top half subassembly 206 of system 200. In the exemplary embodiment, subassembly 206 is fabricated from a polycarbonate material and is substantially transparent. Specifically, in the exemplary embodiment, subassembly 206 includes a first substantially semi-cylindrical piece 322 and a second substantially semi-cylindrical piece 324 (not shown in FIG. 4). Pieces 322 and 324 are coupled together to define predetermined inner diameter 326 (shown in FIG. 2) for subassembly 206. In the exemplary embodiment, inner diameter 326 is approximately 4.445 centimeters (cm) (1.750 inches) (in)). Alternatively, inner diameter 326 may be any length that facilitates operation of system 200 as described herein. Inner diameter 326, is sized to channel a predetermined air velocity therethrough that facilitates transport of cable stripping waste products 229 (shown in FIG. 1) while reducing vacuum-assisted air flow.

Subassembly 206 also includes a first end piece 328 that includes a pair of extensions 330 that are each formed with an orifice 332 that is sized to receive a thumbscrew 106 therein for use in coupling system 200 to cable stripping machine 100 and piece 314. Piece 328 also includes a cable insertion port 334 that is defined within to enable cable end 107 of cable 105 (both shown in FIG. 1) to be introduced to cutting heads 104 to facilitate end stripping of such cable 105. Piece 328 is coupled to piece 322. Subassembly 206 also includes a second end piece 336 that is coupled to piece 322. Subassembly 206 further includes an upper inboard piece 340 that includes a plurality of semi-circular cutouts (not shown) defined therein that are discussed further below. Piece 340 is slidingly coupled to pieces 310 and 308.

FIG. 5 is a front perspective schematic view of vacuum fixture mechanism 202 and FIG. 6 is a rear perspective schematic view of vacuum fixture mechanism 202. More specifically, FIGS. 5 and 6 illustrate subassemblies 204 and 206 assembled together to form mechanism 202. Alternatively, mechanism 202 may have any geometry, orientation, and/or numbers of components or subassemblies that enable mechanism 202 to function as described herein. Referring to FIG. 6, pieces 312 and 340 cooperate to define a plurality of gripper jaw drive rod passages 342, wherein such passages are sized and oriented to receive at least a portion of drive rods 102, thereby facilitating installation of system 200 such that gripper jaws 101 and drive rods 102 (both shown in FIGS. 1 and 2) are operable with mechanism 202 installed. Gripper jaws 101 are tediously aligned to facilitate establishing close tolerances for centering cable 105 to substantially obtain optimum stripping results. Such tolerances are typically on the order of 0.00254 centimeters (cm) (0.001 inches (in)). Therefore, vacuum fixture mechanism 202 facilitates installation and removal of system 200 from machine 100 such that the alignment of rods 102 is not substantially disturbed. Moreover, passages 342 are sized and oriented such that pieces 312 and 340 cooperate with drive rods 102 to facilitate sealing at least a portion of mechanism 202, thereby facilitating system 200 in establishing sufficient fluid carrying velocity.

In operation, in the exemplary embodiment, unstripped end 107 of coaxial or triaxial cable 105 (both shown in FIG. 1) is inserted into cable insertion port 334. Cutting heads 104 rotate and vacuum subsystem 220 is automatically energized to induce a vacuum within vacuum fixture mechanism 202. If present, and if needed, compressed gas supply 249 (shown in FIG. 1) is used. Cutting heads 104 contact end 107 and remove portions of braid and plastic sheathing with an aggressive slicing action such that cable stripping waste products 229 (shown in FIG. 1) that include braid bits and plastic sheathing bits are cut away from end 107 and ejected from the vicinity of cutting heads 104 and end 107 at a high velocity. Cable stripping waste products 229 are contained within mechanism 202 and are removed from the vicinity of cutting heads 104 through stripping waste product transport path 228 with a predetermined carrying air velocity and air flow.

Further, in operation, the operator manually adjusts a position of cable end 107 being stripped with respect to cutting heads 104. The operator can position cable end 107 as necessary to facilitate stripping based on visual observation of the stripping operations due to the substantially transparent complexion of mechanism 202. Upon completion of stripping activities cable end 107 is removed from port 334. Inspection of cutting heads 104 is facilitated by operator removal of thumbscrews 106 and removal of mechanism 202.

Further, system 200 facilitates improving the quality of cable stripping while reducing rework and/or scrap by reducing the frequency of cable stripping waste products 229 getting lodged within cutting heads 104.

In an alternative embodiment, in operation, unstripped end 107 of coaxial or triaxial cable 105 is inserted into cable insertion port 334. Cutting heads 104 rotate and as vacuum subsystem 220 is energized, valve 246 is positioned to induce a vacuum within vacuum fixture mechanism 202. Cable stripping waste products 229 are then removed from the vicinity of cutting heads 104 through stripping waste product transport path 228.

Figure 7:
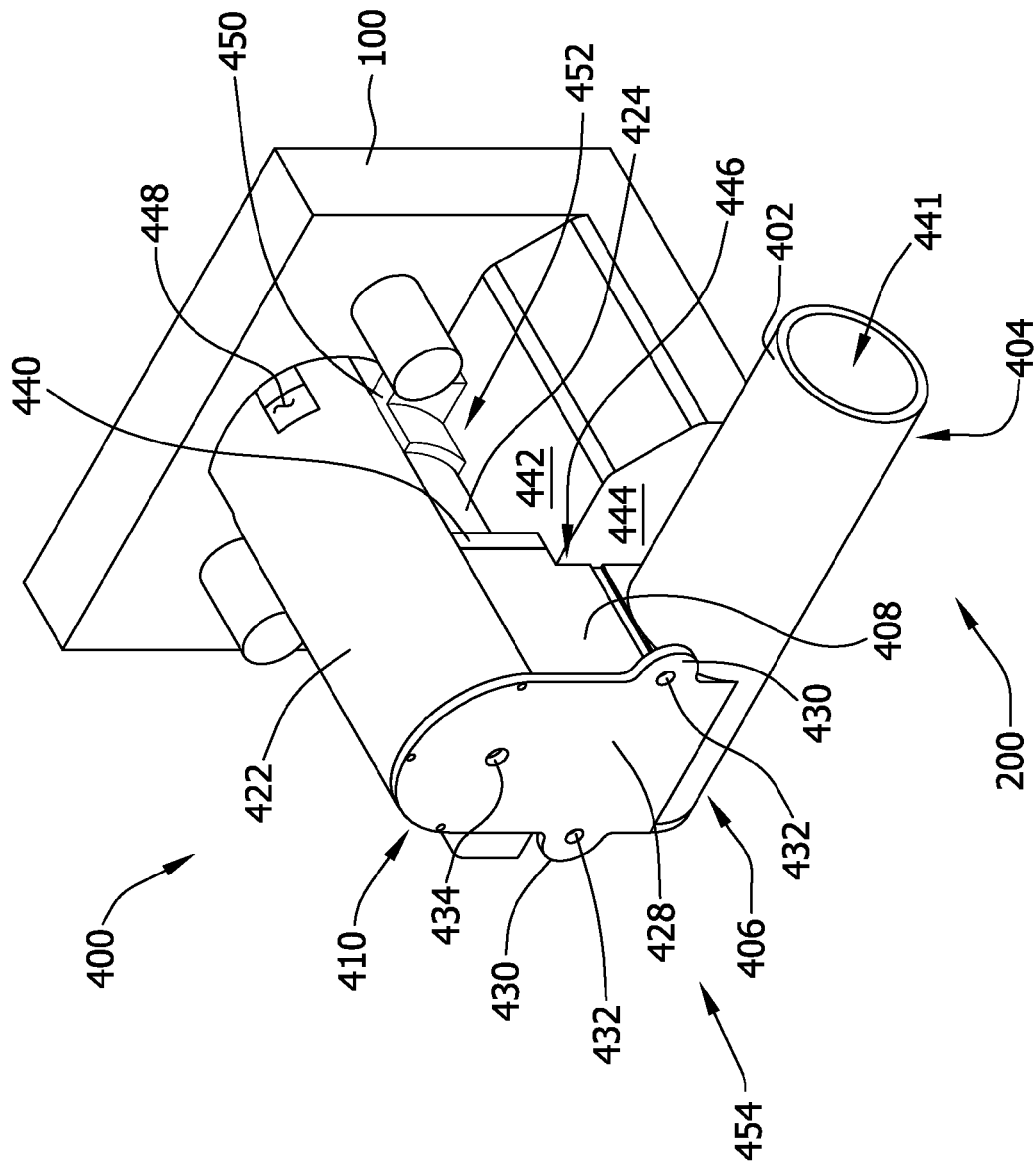
FIG. 7 is a front perspective schematic view of an alternative vacuum fixture mechanism used with the cable stripping waste product reduction system shown in FIG. 1.
Figure 8:
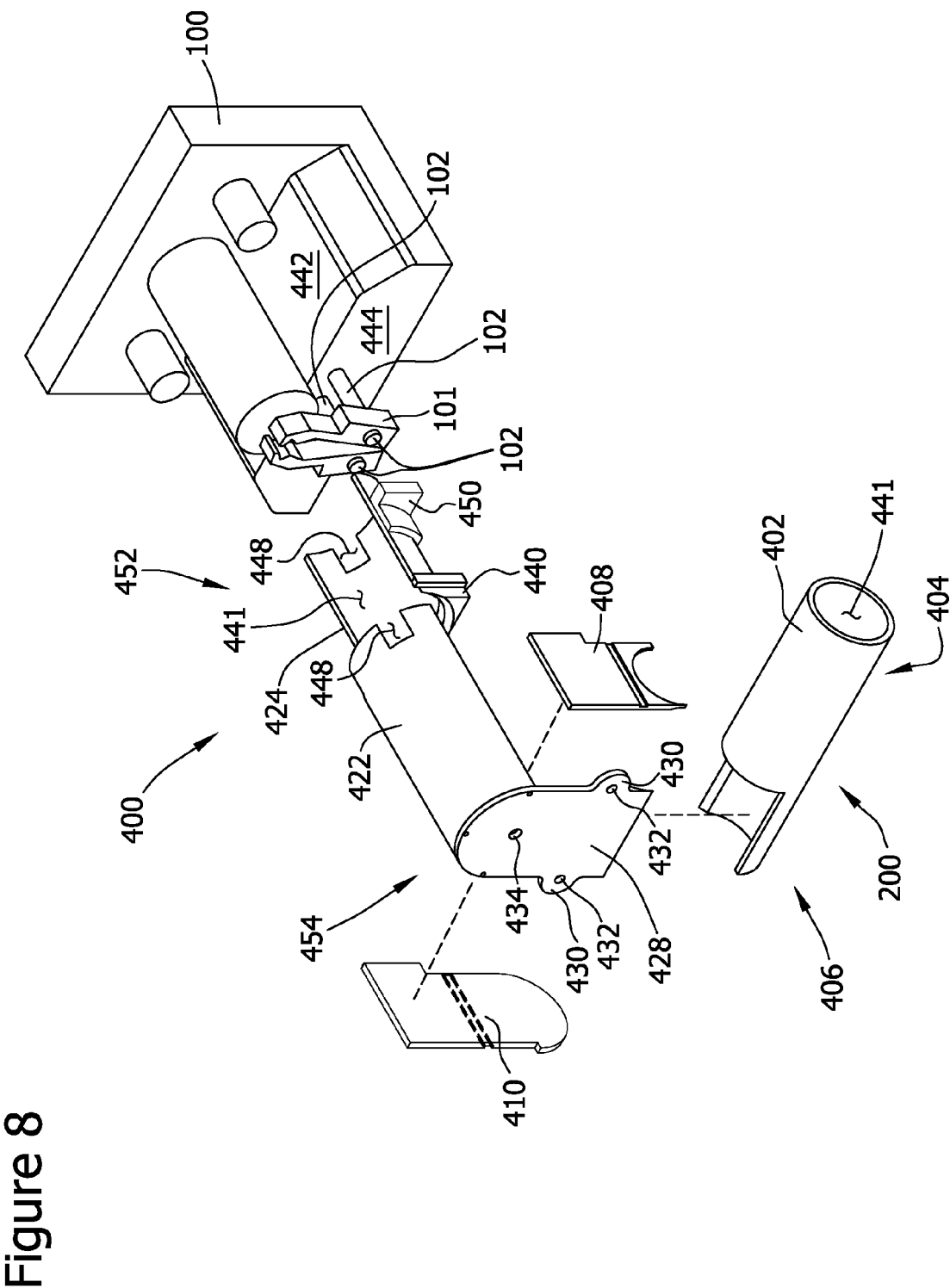
FIG. 8 is a partially exploded front perspective view of the vacuum fixture mechanism shown in FIG. 7.

FIG. 7 is a front perspective schematic view of an alternative vacuum fixture mechanism 400 used with cable stripping waste product reduction system 200. FIG. 8 is a partially exploded front perspective view of alternative vacuum fixture mechanism 400. In this alternative embodiment, mechanism 400 is fabricated from a polycarbonate material and is substantially transparent. Alternatively, mechanism 400 may be fabricated from any material with any opacity that facilitates operation of system 200 as described herein.

In this alternative embodiment, mechanism 400 includes a vacuum connect piece 402. Piece 402 includes a substantially cylindrical end 404 that is coupled in flow communication with transition piece 226 (shown in FIGS. 1 and 2). Piece 402 also includes a substantially semi-cylindrical end 406. Mechanism 400 also includes a first end piece 408 that is coupled to piece 402 between ends 404 and 406. A second end piece 410 is coupled to piece 402 at an outermost portion of end 406.

Mechanism 400 further includes an upper tube piece 422 that is coupled to first end piece 408 and second end piece 410, wherein pieces 408 and 410 cooperate to support upper tube piece 422. Mechanism 400 also includes a lower tube piece 424 that is coupled to pieces 422, 408, and 410. Mechanism 400 further includes a front face piece 428 that is coupled to end 406 of piece 402, piece 408, piece 410, and piece 422. Piece 428 includes two extensions 430 that each include an orifice 432 defined therein. Each orifice 432 is sized to receive thumbscrews 106 (shown in FIGS. 1 and 2) therein that enable mechanism 400 to be coupled to cable stripping machine 100. Piece 428 also includes a cable insertion port 434 that is defined within to enable cable end 107 of cable 105 (both shown in FIG. 1) to be introduced to cutting heads 104 (shown in FIGS. 1 and 2) to facilitate end stripping of such cable 105. Mechanism 400 also includes a bottom tube alignment piece 440 that is coupled to pieces 422, 440, 408, and 410, wherein piece 440 facilitates structural integrity and alignment of mechanism 400. Mechanism 400 further includes an operating switch piece 450 that is coupled to piece 424. Piece 450 is depressed to meet an operational permissive of machine 100, and substantial relaxation of piece 450 de-energizes machine 100.

In the exemplary embodiment, pieces 440, 424, and 450 are coupled together to form a first subassembly 452. Also, in the exemplary embodiment, pieces 422, 428, 410, 408 and 402 form a second subassembly 454. Alternatively, mechanism 400 may include any number of subassemblies that enables operation of system 200 as described herein. In one embodiment, mechanism 400 is a unitary member. In another embodiment, each of subassemblies 452 and 454 are unitary members.

Subassemblies 452 and 454 are coupled together to at least partially define a stripping waste product transport path 441. Transport path 441 further defines at least one predetermined inner dimension (not shown) for mechanism 400, wherein, in this alternative embodiment, such dimension has any value that facilitates operation of system 200 as described herein. Specifically, such dimension is sized to channel a predetermined air carrying velocity therethrough that facilitates transport of cable stripping waste products 229 (shown in FIG. 1) while reducing vacuum-assisted air flow.

Mechanism 400 may have any geometry, orientation, and/or numbers of components or subassemblies that enable system 200 to function as described herein. In contrast to mechanism 202 (shown in FIGS. 1, 2, 5, and 6), mechanism 400 substantially extends over gripper jaws 101 and drive rods 102 (both shown in FIGS. 1 and 2), thereby also facilitating installation of system 200 such that gripper jaws 101 and drive rods 102 are operable with mechanism 400 installed. Therefore, vacuum fixture mechanism 400 facilitates installation and removal of system 200 from machine 100 such that the alignment of rods 102 is not substantially disturbed. Also, in contrast to mechanism 202, in this alternative embodiment, mechanism 400 includes the seven pieces 402, 408, 410, 422, 424, 428, and 440 as described above, wherein mechanism 400 is simpler to assemble than mechanism 202. In this alternative embodiment, adaptor piece 230 (shown in FIGS. 1 and 2) is not used to facilitate coupling mechanism 400 to machine 100. In other alternative embodiments, adaptor piece 230 is used as described herein.

Cable stripping machine 100 includes a substantially horizontal planar surface 442 and a substantially vertical planar surface 444, wherein piece 440 cooperates with surface 442 to facilitate structural integrity and alignment of mechanism 400. Moreover, surface 442 cooperates with piece 440 to at least partially form a seal 446 between mechanism 400 and machine 100. Also, surface 442 and surface 444 cooperate with pieces 408 and 410 to partially form seal 446 between mechanism 400 and machine 100, wherein seal 446 facilitates establishing sufficient fluid carrying velocity. Therefore, in this alternative embodiment, pieces 422 and 424 include at least one cutout 448 each, wherein each cutout 448 is sized and oriented to facilitate establishing sufficient fluid carrying velocity.

Operation of vacuum fixture mechanism 400 is substantially similar to that of vacuum fixture mechanism 202. Specifically, in this alternative embodiment, unstripped end 107 of coaxial or triaxial cable 105 (both shown in FIG. 1) is inserted into cable insertion port 434. Cutting heads 104 rotate and vacuum subsystem 220 (both shown in FIGS. 1 and 2) is automatically energized to induce a vacuum within vacuum fixture mechanism 400. If present, and if needed, compressed gas supply 249 (shown in FIG. 1) is used. Cutting heads 104 contact end 107 and remove portions of braid and plastic sheathing with an aggressive slicing action such that cable stripping waste products 229 (shown in FIG. 1) that include braid bits and plastic sheathing bits are cut away from end 107 and ejected from the vicinity of cutting heads 104 and end 107 at a high velocity. Cable stripping waste products 229 are contained within mechanism 400 and are removed from the vicinity of cutting heads 104 through stripping waste product transport path 441 with a predetermined carrying air velocity and air flow. Such carrying velocity is facilitated by cutouts 448 and seal 446.

Further, in operation, the operator manually adjusts a position of cable end 107 being stripped with respect to cutting heads 104. The operator can position cable end 107 as necessary to facilitate stripping based on visual observation of the stripping operations due to the substantially transparent complexion of mechanism 400. Upon completion of stripping activities cable end 107 is removed from port 434. Inspection of cutting heads 104 is facilitated by operator removal of thumbscrews 106 (shown in FIGS. 1 and 2) and removal of mechanism 400. Further, system 200 facilitates improving the quality of cable stripping while reducing rework and/or scrap by reducing the frequency of cable stripping waste products 229 getting lodged within cutting heads 104.

In another alternative embodiment, in operation, unstripped end 107 of coaxial or triaxial cable 105 is inserted into cable insertion port 434. Cutting heads 104 rotate and as vacuum subsystem 220 is energized, valve 246 (shown in FIG. 1) is positioned to induce a vacuum within vacuum fixture mechanism 400. Cable stripping waste products 229 are then removed from the vicinity of cutting heads 104 through stripping waste product transport path 441.

Figure 9:
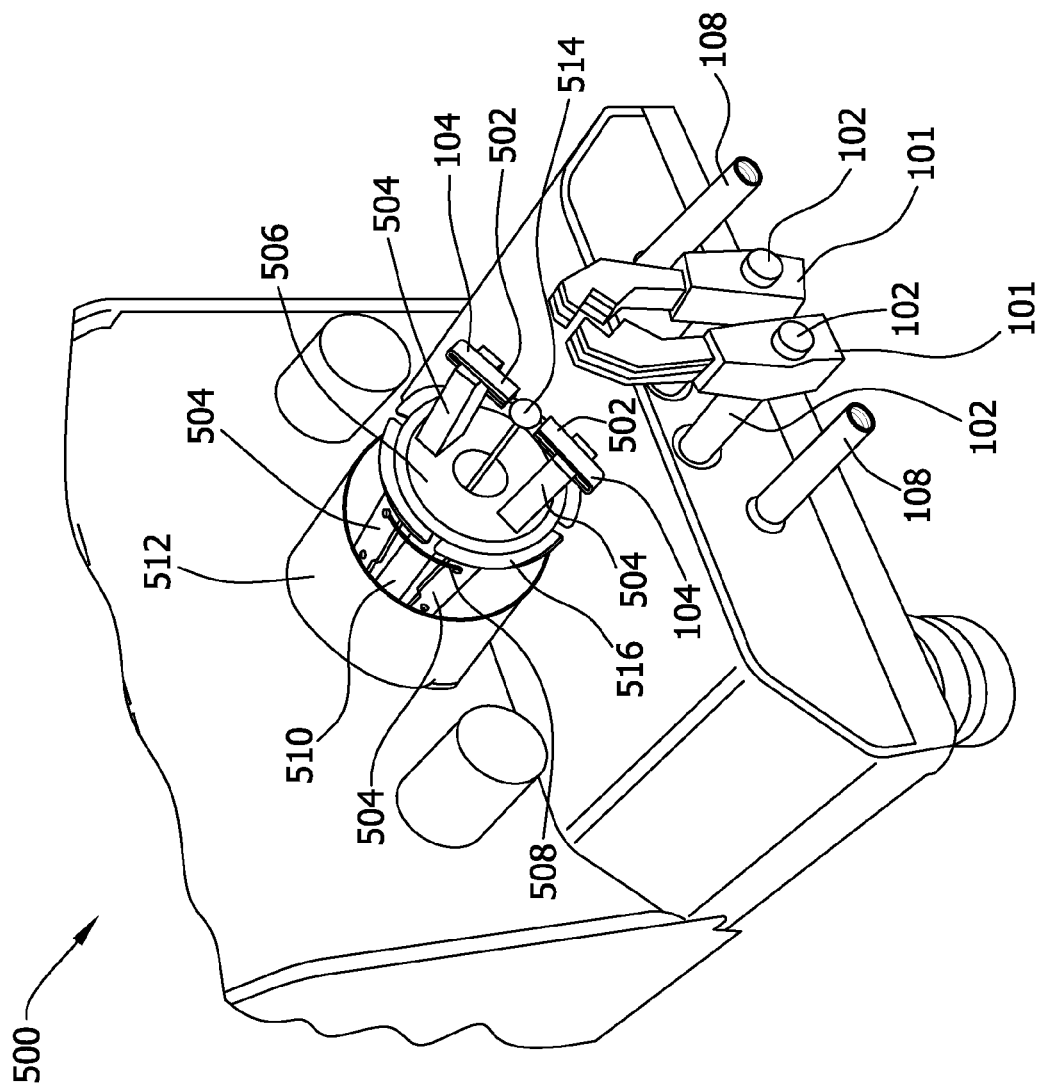
FIG. 9 is a front perspective view of an alternative cable stripping machine used with the vacuum fixture mechanisms shown in FIGS. 5 and 7.

FIG. 9 is a front perspective view of an alternative cable stripping machine 500 used with vacuum fixture mechanisms 202 and 400, shown in FIGS. 5 and 7, respectively. Machine 500 is similar to machine 100, wherein both machines 100 and 500 include cable gripper jaws 101, cable gripper jaw drive rods 102, and cutting heads 104. Each of cutting heads 104 include at least one cutting blade 502. Each of drive rods 102 is rotatably coupled to a drive unit that facilitates closing of gripper jaws 101 when machines 100 and 500 are energized, and facilitates opening of gripper jaws 101 when machines 100 and 500 are de-energized. Moreover, machines 100 and 500 also include a plurality of cutter arms 504, wherein each of cutter heads 104 is adjustably coupled to one of arms 504. Each of arms 504 are pivotably coupled to each other by at least one spring 508 and both arms 504 extend through a substantially circular arm support 506.

Also, machines 100 and 500 both include a drive shaft 510, wherein arm support 506 is rotatably coupled to drive shaft 510. Further, machines 100 and 500 both include a shaft enclosure mechanism 512 that substantially extends about at least a portion of drive shaft 510. Both mechanism 512 and shaft 510 are rotatably coupled to a drive motor (not shown). Moreover, mechanism 512 and shaft 510 are coupled to an axial drive unit (not shown), wherein such axial drive unit facilitates axial movement of shaft 510, mechanism 512, arms 504, and cutting heads 104. Furthermore, machines 100 and 500 both include a trigger stop 514 that is axially operable and extends through at least a portion of shaft 510. Trigger stop 514 is coupled to an electrical control circuit (not shown) within machines 100 and 500, wherein trigger stop 514 energizes machines 100 and 500 upon insertion of a cable or wire (not shown in FIG. 9).

Machine 500 is distinguished from machine 100 in that machine 500 includes a positive pressure source, or more specifically, a plurality of airfoils, or fan blades 516 coupled to arm support 506. Fan blades 516 facilitate forming a positive pressure in the vicinity of arm support 506 during operation of machine 500, wherein fan blades 516 facilitate establishing the predetermined fluid carrying velocity. Alternatively, machine 500 may be distinguished from machine 100 by modifying cutting heads 104 to establish a vacuum just downstream of cutting heads 104 and/or a positive pressure region just upstream of cutting heads 104.

In operation of both machines 100 and 500, unstripped end 107 of coaxial or triaxial cable 105 (both shown in FIG. 1) is inserted into either of cable insertion ports 334 and 434 (shown in FIGS. 2 and 7, respectively). End 107 is inserted sufficiently to depress trigger stop 514 axially inward, wherein shaft enclosure mechanism 512, drive shaft 510, arm support 506, cutter arms 504, and cutter blades 104 are rotated. Moreover, gripper jaws 101 are closed upon cable 105 by a small rotation of drive rods 102, thereby facilitating steady placement of cable end 107 with respect to cutter blades 502. Vacuum subsystem 220 is operated as described above and air flow with the predetermined fluid carrying velocity being established in the vicinity of cutting heads 104. If present, and if needed, compressed gas supply 249 (shown in FIG. 1) is used. Both machines 100 and 500 include a plurality of resident programming instructions (not shown) that facilitate stripping operations. Specifically, machines 100 and 500 include a resident program associated with each type of cable and wire that are stripped with machines 100 and 500. Such resident programs include instructions that facilitate axial and rotational positioning of cutting blades 502 and positioning of gripper jaws 101 by drive shafts 102, thereby facilitating at least partially automated stripping operations.

Operation of machine 500 is contrasted with operation of machine 100 in that upon energization of machine 500, rotation of arm support 506 also induces rotation of fan blades 516. Rotation of fan blades 516 facilitates forming a positive pressure in the vicinity of arm support 506 during operation of machine 500, wherein fan blades 516 facilitate establishing the predetermined fluid carrying velocity.

Both machines 100 and 500 de-energize upon completion of the associated program for stripping end 107 of cable 105, wherein all rotation and axial drive motion are substantially reduced and gripper jaws 101 open to release cable 105 for subsequent removal by the operator.

The methods and apparatus described herein facilitate reducing braid bit buildup and fouling of an associated sheath removal machine, and more specifically, a cable stripping machine. As such, the methods and apparatus facilitate cost-effective and reliable operation of such stripper machines. Specifically, the cable stripping waste product reduction systems described herein use a vacuum process that facilitates reducing nuisance braid bits as soon as such braid bits are formed. Such cable stripping waste product reduction systems may be installed at the factory or retrofitted to existing stripping machines. Moreover, such cable stripping waste product reduction systems are substantially automated and may be used in service substantially continuously during stripping operations, thereby enabling real-time cleaning. Also, the system may be assembled and/or disassembled easily to facilitate reducing machine down time. Further, the system facilitates improving the quality of cable stripping while reducing rework and/or scrap by reducing the frequency of cable stripping waste products getting lodged within the cutting heads of the cable stripping machine. Moreover, the waste product reduction systems described herein may be adapted for other tools wherein localized waste product is undesirable. Examples of such tools include, but are not limited to, braided hose sheathing removal apparatus and dust producing tools such as table saws, drills, grinders, and pipe threaders.

Exemplary embodiments of apparatus used to reduce braid bits while using a cable stripper machine are described above in detail. The methods, apparatus and systems are not limited to the specific embodiments described herein nor to the specific illustrated cable stripping waste product reduction systems. While the invention has been described in terms of various specific embodiments, those skilled in the art will recognize that the invention can be practiced with modification within the spirit and scope of the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A sheath removal waste product reduction system comprising:
   at least one conduit coupled to a sheath removal machine, said at least one conduit comprises a plurality of substantially transparent members oriented to at least partially define a fixture mechanism, said fixture mechanism further comprising a top subassembly and a bottom subassembly detachably coupled to said top subassembly with at least one aperture formed in at least one of said top subassembly and said bottom subassembly for detachably coupling to the waste product generation device, said fixture mechanism defines a substantially cylindrical portion sized to enclose a waste product generation device therein; and
   at least one fluid flow induction device coupled in flow communication with said at least one conduit, wherein said at least one fluid flow induction device induces a predetermined fluid carrying velocity within said at least one conduit.

2. A sheath removal waste product reduction system in accordance with claim 1 further comprising at least one of:
   a portable vacuum hose coupled in flow communication with said vacuum source;
   an electrical control circuit for said vacuum source electrically coupled to an electrical control circuit for at least one sheath removal device such that operation of the at least one sheath removal device automatically energizes said vacuum source; and
   an electrical control circuit for a control valve positioned between the at least one sheath removal device and said vacuum source such that operation of the at least one sheath removal device automatically positions said control valve to a predetermined position.

3. A sheath removal waste product reduction system in accordance with claim 1 wherein said fixture mechanism is substantially transparent and facilitates visual observation of at least one sheath removal device.

4. A sheath removal waste product reduction system in accordance with claim 3 wherein said fixture mechanism is configured with a predetermined diameter of approximately 4.445 centimeters (cm) to induce a predetermined air velocity at a predetermined air flow therethrough.

5. A sheath removal waste product reduction system in accordance with claim 1 further comprising a manual snipping station comprising:
   a collection cup;
   a flexible positioning member adjustably coupled to said collection cup; and
   a magnetic base adjustably coupled to said flexible positioning member.

6. A sheath removal machine comprising:
   at least one sheath cutting device; and
   a sheath removal waste product reduction system comprising:
      at least one conduit configured to be coupled in flow communication with said sheath cutting device, said at least one conduit comprises a plurality of substantially transparent members at least partially defining a fixture mechanism, said fixture mechanism comprising a top subassembly and a bottom subassembly detachably coupled to said top subassembly with at least one aperture formed in at least one of said top subassembly and said bottom subassembly for detachably coupling to the waste product generation device, said fixture mechanism defines a substantially cylindrical portion sized to enclose said sheath cutting device therein; and
      at least one fluid flow induction device coupled in flow communication with said at least one conduit, wherein said at least one fluid flow induction device induces a predetermined fluid carrying velocity within said at least one conduit.

7. A sheath removal machine in accordance with claim 6 wherein said at least one fluid flow induction device is a vacuum source.

8. A sheath removal machine in accordance with claim 7 further comprising at least one of:
   a portable vacuum hose coupled in flow communication with said vacuum source;
   an electrical control circuit for said vacuum source electrically coupled to an electrical control circuit for said at least one sheath cutting device such that operation of said at least one sheath cutting device automatically energizes said vacuum source; and
   an electrical control circuit for a control valve positioned between said at least one sheath cutting device and said vacuum source such that operation of said at least one sheath cutting device automatically positions said control valve to a predetermined position.

9. A sheath removal machine in accordance with claim 6 wherein said fixture mechanism is substantially transparent and facilitates visual observation of said at least one sheath cutting device.

10. A sheath removal machine in accordance with claim 9 wherein said fixture mechanism is configured with a predetermined diameter of approximately 4.445 centimeters (cm) to induce a predetermined air velocity at a predetermined air flow therethrough.

* * * * *